United States Patent [19]

Glasow

[11] 4,456,408
[45] Jun. 26, 1984

[54] HIGH SPEED MILLING CUTTER

[76] Inventor: Kenneth E. Glasow, 869 Chambers St., Spencerport, N.Y. 14559

[21] Appl. No.: 338,714

[22] Filed: Jan. 11, 1982

[51] Int. Cl.³ .............................................. B26D 1/00
[52] U.S. Cl. ...................................... 407/35; 407/41; 407/43; 407/46; 407/50; 407/52; 407/91; 407/110
[58] Field of Search ...................... 407/11, 31, 35, 37, 407/41, 43, 46, 21, 22, 50, 52, 88, 91, 101, 110, 42

[56] References Cited

U.S. PATENT DOCUMENTS

| 582,081 | 5/1897 | Newton | 407/11 |
|---|---|---|---|
| 1,089,527 | 3/1914 | Bolton | 407/41 |
| 2,805,467 | 9/1957 | Greenleaf | 407/52 |
| 2,975,507 | 3/1961 | Wilder | 407/35 |
| 3,104,453 | 9/1963 | Greenleaf | 407/41 |
| 3,300,834 | 1/1967 | Stone | 407/35 |
| 3,378,901 | 4/1968 | Dupuis | 407/38 |
| 3,487,535 | 1/1970 | Begle | 29/464 |
| 3,641,642 | 2/1972 | Schmidt | 407/11 |
| 3,655,969 | 4/1972 | Pollington et al. | 407/91 |
| 3,675,290 | 7/1972 | Mayer | 407/37 |
| 3,757,397 | 9/1973 | Lindsay | 407/41 |
| 4,212,567 | 7/1980 | Wermeister | 407/46 |

FOREIGN PATENT DOCUMENTS

| 2551183 | 5/1977 | Fed. Rep. of Germany | 407/37 |
|---|---|---|---|
| 2269395 | 11/1975 | France | 407/41 |
| 2364724 | 5/1978 | France | 407/41 |

Primary Examiner—Leonidas Vlachos

[57] ABSTRACT

A milling cutterhead provided with slots for receiving indexable, disc-shaped cutting bits mounted in individual nest plates. The cutterhead is a generally cylindrical body comprising two concentric body parts, namely, a main member having a circumferential rim portion and an interior ring member which mates with and fits tightly within that rim portion. The nest-receiving slots are cut through the full radial width of the rim portion, and the outer circumference of the interior ring forms the inner walls of the slots. Each nest plate supports more than one-half the circumference of its respective indexable bit at three or more spaced locations so that any inserted bit, no matter how indexed, will have either its radial or axial diameter substantially aligned in a predetermined plane, thereby assuring that the cutting edge of each indexable disc-shaped bit will be positioned to an axial or radial accuracy equal to or less than one-half the diametral tolerance for such disc-shaped bits. With such assured accuracy, no further truing of the individual bits is required when they are indexed. Further, the interior ring design of the cutterhead reduces the probability of stress-related failures and provides increased rigidity needed for high-speeding cutting, and separate tightening wedges permit cutting discs to be readily indexed and/or changed without disturbing the nest plates and without necessitating further truing of such indexed or newly-inserted bits.

6 Claims, 10 Drawing Figures

HIGH SPEED MILLING CUTTER

This invention relates to milling-type cutters and, more particularly, to cutters subjected to the increased forces which accompany high speed cutting, such cutters being of the type in which a plurality of indexable tools are mounted in a single tool body so that the individual tools can be indexed to expose fresh cutting surfaces.

BACKGROUND OF THE INVENTION

Milling cutter heads normally support a plurality of cutting tool elements spaced about the circumference of the head in a manner which projects the cutting edge of each of the tools into a common plane. In many well-known designs, such tool elements are in the form of indexable bits formed with a plurality of similar cutting edges, the bits being commonly shaped in the form of triangles, squares, hexagons, etc., with each side comprising a separate cutting edge. Such indexable bits are also designed in disc-shapes with the entire circumference of the disc forming a cutting edge. When one side of such an angular bit or one segment of such a disc-shaped bit becomes dull, the bit is indexed in the cutterhead to provide a new cutting edge. Examples of such cutters are shown in U.S. Pat. Nos. 3,487,535 and 4,212,567.

In most prior art milling cutters, the individual tool bits are mounted directly in the cutterhead (e.g., U.S. Pat. No. 3,378,901) but, in some designs, the bits are first inserted in a holder or nest plate prior to being received into the cutterhead to simplify manufacture of the head and to facilitate truing adjustment of the individual bits relative to each other (e.g., U.S. Pat. No. 3,675,290).

In these prior art cutters, the blades, or the blade/nest plate combinations, are respectively received into individual openings formed in the body of the cutterhead. These openings, generally rectangular in form, are cut directly in the solid annular body that comprises the major portion of the cutterhead, being open to the outer circumference of the body but having the floor, side, and interior walls formed integral with the solid body.

There are two major criteria which must be met by the design of such milling cutters. The first is rigidity, which must be sufficient to prevent vibration, chatter and any loosening of the relatively small inserted cutting tools under expected cutting forces. The second relates to accuracy and the ability to true each of the separate individual cutting tools so that the cutting edges of all of the tools project in a nearly identical track in the cutting plane. To appreciate the difficulty in meeting this second criteria, it must be understood that, within the present limits of commercial practicality, small, indexable cutter bits can only be manufactured with a tolerance of approximately ±0.0005 (0.013 mm) while axial accuracy required for finishing work may approach blade-to-blade "truing" tolerances of ±0.00025" (0.007 mm). To achieve such accuracies, the cutter design must usually include some mechanism whereby truing adjustments may be made to the position of each inserted cutting tool. Such adjustment is difficult and takes considerable time, thereby increasing costs and reducing production and, in addition, the adjustment mechanism often results in a reduction of rigidity.

Further, as attempts are made to speed up cutting processes, the cutting forces experienced by the tools increase, and it must be appreciated that the difficulty of meeting rigidity and accuracy requirements increases dramatically. Therefore, even though individual cutting tool elements are presently available in carbide or ceramic materials which are capable of cutting under such higher forces, milling speeds have not been increased to take advantage of such new types of cutting materials because of the rigidity and accuracy problems just referred to above.

An important limitation on such increased speed has been created by the radial stresses which tend to cause failure in the solid body of the cutterhead at the intersections of the side and interior walls of the openings which receive the blades or blade/nest plate combinations.

BRIEF SUMMARY OF THE INVENTION

The invention disclosed herein avoids stress-related failures of the cutterhead by dividing the traditionally solid annular body into two separate and distinct structural elements: A main member having a circumferential rim portion, and an interior ring which mates with that rim portion and fits tightly within it. The blade-receiving openings are no longer formed completely by a single, solid annular member. Rather, the openings are formed by both of the just-mentioned cutter body elements. Individual slots are cut through the entire radial width of the rim portion of the cutter body to provide the floor and side walls of the blade-receiving opening. The interior wall of each respective opening is formed by the outer circumference of the interior ring. This simple construction feature greatly reduces the probability of stress-induced cutterhead failures which have limited cutter speed/feed rates with prior art milling cutters. This important change, along with the nest-plate design referred to below, have combined to provide a milling cutter which can be operated at speeds and feed rates considerably beyond the power capabilities of most, if not all, existing milling machines.

Heretofore, the limiting factor in milling production has been the cutter, but with the invention herein, production is primarily limited by the ability to find machines of sufficient power and rigidity to drive the disclosed cutter.

Also, according to another feature of the invention herein, disc-shaped cutting tools (e.g., carbides or ceramics) are placed in individual nest plates which receive and hold the cutting tools by supporting a major portion of their circumference at three or more spaced locations. Two of these spaced supports are fixed relative to the main body of the nest plate and arranged so that any disc-shaped cutting tool resting thereon will always have at least one of its orthogonal diameters (either its radial or axial diameter) substantially aligned in a predetermined plane, the other support or supports being adjustable to compensate for differences in disc diameter within the known tolerances of these cutting tools. The terms "radial" and "axial" relate to directions relative to the cutterhead, and a set of nest plates is designed for either maximum radial or maximum axial accuracy, according to the specifications of the work being milled.

The nest plates, which carry respective disc-shaped cutting tools, are received into the respective slots formed in the milling cutter head in the manner described above, being tightened into position by means of a pair of wedges, one of which secures only the nest plate, while the other wedge secures only the cutting disc.

The nest plates are always received in the cutter head in substantially the same position, and no further adjustment is required to true the individual disc-shaped cutting tools because of the spaced support feature of the nest plate referred to above. That is, the position of the spaced supports assures that any disc-shaped cutting tool, regardless of its actual diameter (so long as within the manufacturer's tolerance), will always have either its radial or axial diameter aligned substantially in the same plane when it is secured to its nest plate. Since the nest plates maintain the centers of the inserted disc-shaped tool bits in substantially the same plane, the projections of their respective cutting edges axially or radially into the cutting plane vary less than the differences between the radii of the disc-shaped tools. Therefore, the manufacturer's tolerance (for disc diameter) is, in effect, at least halved when reflected as differences in the position of the discs' cutting edges in the cutting plane. By halving, or more than halving, the manufacturer's tolerance, the invention assures that the position of the cutting edge of each cutting disc will fall within the normally required blade-to-blade tolerance (as long as its nesting plate is properly positioned in the cutter head) and no special truing mechanism is required.

Accuracy in the positioning of each nesting plate is facilitated by means of an additional feature of the interior ring member which, as noted above, is fitted within the rim portion of cutterhead to form the interior walls of the respective nest-receiving openings. The outer circumference of this ring has a tapered face which mates with a similarly tapered surface on each nest plate and, in conjunction with the wedges referred to above, applies a pressure to each nest plate to position the bottom of the nest plate firmly against the floor of its respective slot in the cutterhead. This interrelation between the ring, cutterhead and wedges preloads the nest plate and disc cutters to provide the special rigidity required for high speed milling, and the nest plate design just referred to above assures desired accuracy without requiring separate truing adjustments for individual blades.

In addition to the critical requirements for rigidity and accuracy, the milling cutter disclosed herein also provides a significant advantage in regard to productivity. The cutting edges of the tools can be readily indexed, and/or the discs can be replaced, without dismantling of the cutterhead or even altering the position of the nest plates. By merely loosening (a) the upper wedges securing the individual cutting discs and (b) the screws which adjust the nesting plates for variances in the diametral tolerances of the discs, the discs are released sufficiently to permit them to be removed or indexed to expose new cutting edges. Then, the simple acts of retightening the adjusting screw and upper wedge again readies the cutter for use without the necessity of further truing. As will be noted, in some disclosed embodiments of the nest plate only the upper wedge need be removed, and the discs are merely pressed out of and back into the nest plate for indexing, no adjusting screw being required.

The detailed description of the invention which follows will be made with reference to the accompanying drawings in which.

Figure 1:
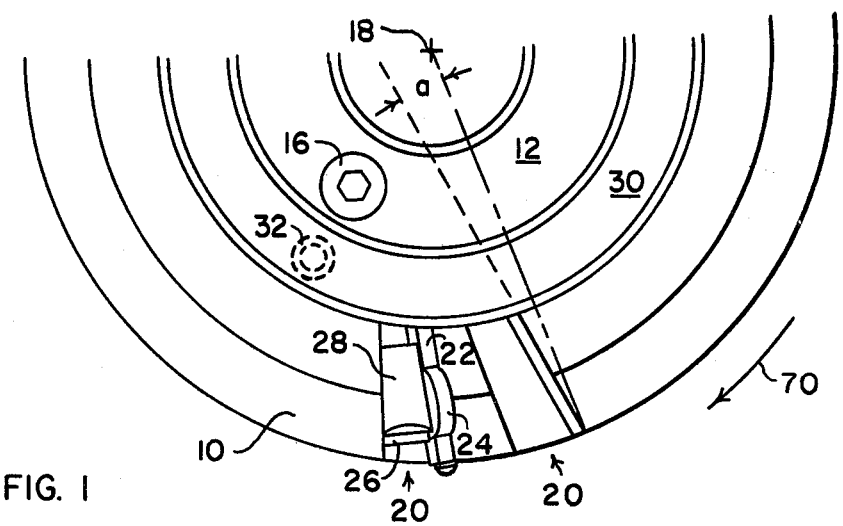
FIG. 1 is a plan view of a portion of an annular milling cutter according to the invention showing only two slots, one empty and the other with a nest plate, disc-shaped cutting tool, and wedges in place.
Figure 2:
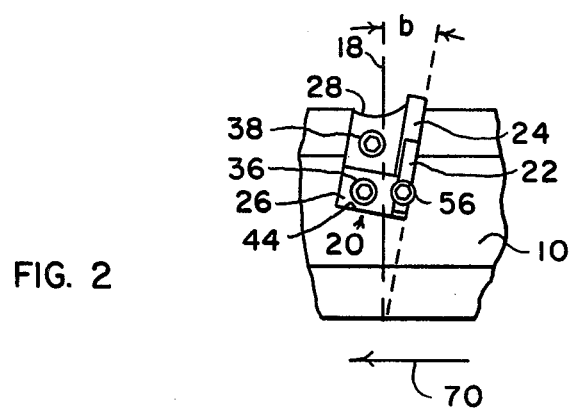
FIG. 2 is a partial side elevation of the milling cutter of FIG. 1 showing only a single slot with the nest plate, disc-shaped cutting tool, and wedges in place.
Figure 3:
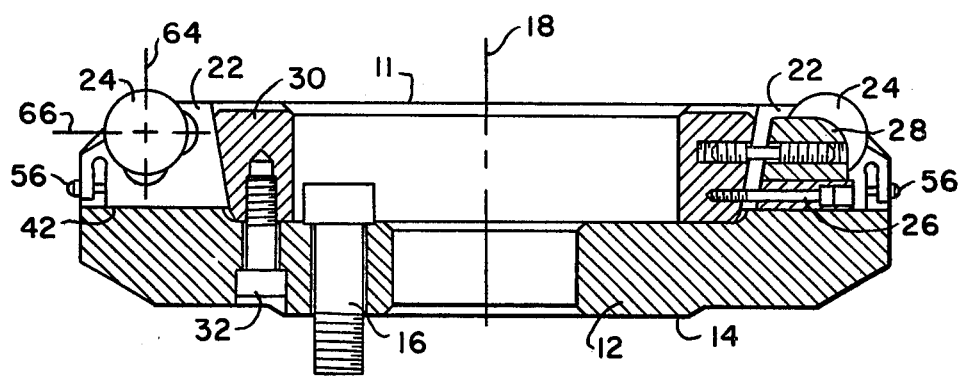
FIG. 3 is a cross sectional view of the face mill cutter shown in FIG. 1.

DETAILED DESCRIPTION OF THE INVENTION (a) Preferred Cutterhead/Nest Plate Combination Referring first to FIGS. 1, 2 and 3, the two-piece milling cutterhead disclosed herein comprises a generally annular member in which the circumference is formed by a rim portion 10 which also forms a portion of a front face 11. Rim portion 10 surrounds a central web 12 defining a back face 14. Bolts 16 fitted through central web 12 are used to secure the cutterhead to the arbor of a machine spindle for rotation about axis 18.

A plurality of slots 20 formed through the full radial width of rim portion 10 are adapted to receive nest plates 22 which, in turn, support cutting tools in the form of cylindrical disc-shaped bits 24. A first (lower) wedge 26 and a second (upper) wedge 28 are also received into each slot 20.

The basic structural body of the cutterhead is completed by a ring member 30 which forms the remaining portion of front face 11 and fits within rim portion 10 of the annular member, being secured to central web 12 by bolts 32. Ring member 30 has a tapered outer diameter surface 34 which is adapted to mate with a similarly tapered inner diameter surface of rim portion 10 of the cutter body with sufficient draw (i.e., being appropriately oversized) so that bolts 32 must be drawn up tightly in order to bring the bottom of ring member 30 into contact with central web 12, thereby providing sufficient preload to assure the tightness of the ring and increasing the rigidity of the entire cutter head assembly.

Each of the wedges 26, 28 is drawn toward ring member 30 by respective bolts 36, 38 which screw into the ring member. As bolt 36 is tightened, wedge 26 acts against nest plate 22 to pull seating surface 40 of nest plate 22 tightly against the mating tapered outer diameter surface 34 of ring 30, and the interaction of these mating surfaces tends to press the bottom surface 42 of nest plate 22 firmly against the floor 44 of slot 20.

(b) Preferred Nest Plate

Figure 4:
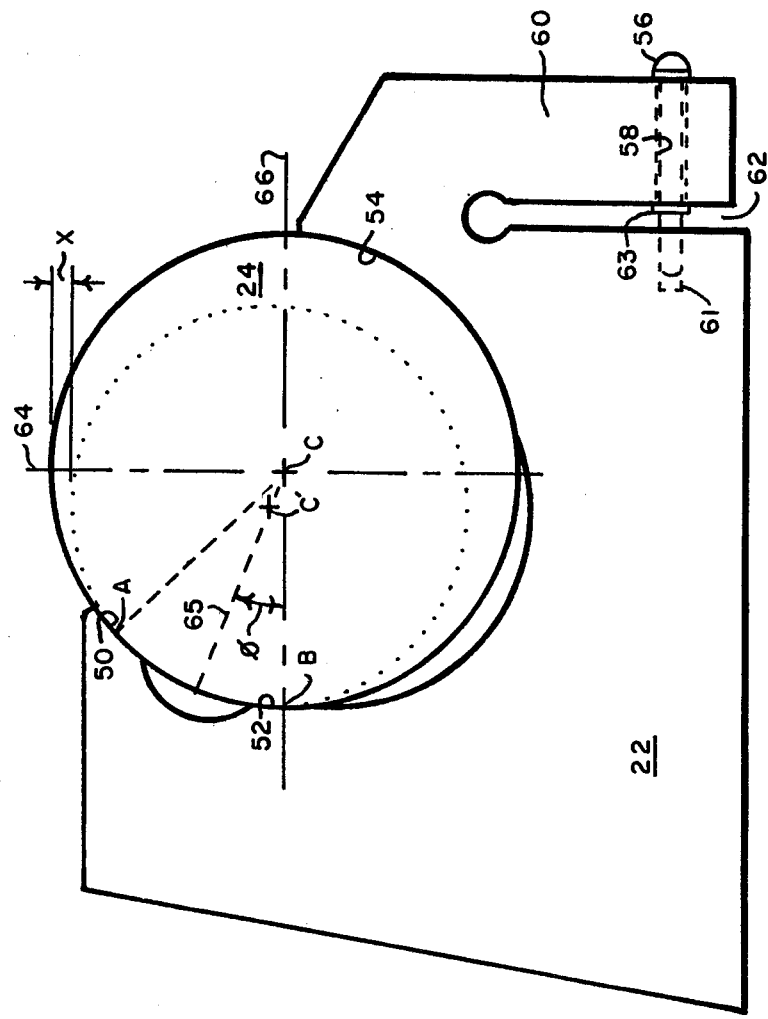
FIG. 4 is a greatly enlarged view of the preferred embodiment of nest plate holding a cylindrical disc-shaped cutting tool.

The combination of nest plate and cutting disc is shown in enlarged form in FIG. 4. The outer circumference of a disc-shaped bit 24 is received by three support surfaces 50, 52, 54 of nest plate 22, and support adjusting means are provided to secure bit 24 and to adjust for small differences in the size of such bits: Support surface 54 is movable relative to support surfaces 50 and 52 by means of an adjustment screw 56 which passes through bore 58 in extended portion 60 of nest plate 22 and is received in threaded bore 61 formed in the main body of the nest plate. Extended portion 60 is separated slightly from the main body of nest plate 22 by a thin slot 62, and a split collar 63, which is press-fitted to screw 56, acts against extended portion 60, in conjunction with the head of screw 56, to cause the very slight movement of support surface 54 necessary to adjust for small variations in the diameters of commercially available disc-shaped cutting bits 24.

The slight movement of support surface 54 in response to the turning of adjustment screw 56, as just described above, is also sufficient to hold disc-shaped bit 24 against surfaces 50 and 52 which remain fixed relative to the main body of nest plate 22. In this regard, it should be noted that the circumferential arc measured from the outside of support surface 50 through support surface 52 to the outside of support surface 54 is more than one-half of the circumference of disc-shaped bit 24 so that the remaining chord between opposed support surfaces 50 and 54 is less than the diameter of bit 24, thereby assuring that pressure applied at these two support surfaces will hold bit 24 in position.

The arrangement of the support surfaces is an important feature of the invention. Namely, two of the surfaces 50, 52 are fixed relative to the main body of nest plate 22, and these two surfaces are spaced so that a line 65, which bisects support surfaces 50 and 52 and passes through the center C of cutting tool 24, forms an acute angle $\emptyset$ with radial diameter 66. As noted above, nest plates are designed for either maximum radial or maximum axial accuracy. Since this preferred embodiment is designed for cutter-axial accuracy, angle $\emptyset$ is formed with radial diameter 66 rather than the other othogonal diameter (axial diameter 64).

To facilitate explanation of this important feature, it is assumed in FIG. 4 that (a) disc-shaped bit 24 has the maximum allowable diameter (within the manufacturer's commercial tolerance) and (b) the dotted lines show, in superimposition, the location of a second cutting disc having the minimum allowable diameter. It must be appreciated, however, that the illustrated reduction in disc diameter has intentionally been grossly exaggerated, since in actual practice the diameters of commercially available disc-shaped bits do not vary by more than 0.001" (0.025 mm) and, therefore, would not be particularly noticeable even in this enlarged view.

Attention is now called to the fact that the center C' of the smaller disc-shaped bit (dotted line) is located on bisecting line 65. Further, because the circumferences of the disc-shaped bits are always held tightly against support surfaces 50 and 52, the center of any other "in tolerance" disc will also always fall on this same line 65 somewhere between centers C and C'. Since line 65 makes an acute angle $\emptyset$ with the radial diameter 66 of cutter bit 24, it will be appreciated that the vertical distance between the centers C and C' is substantially equal to:

$$\Delta r \sin \emptyset$$

where $\Delta r$ is the difference between the radii of any two disc-shaped bits. Thus, the projection (above the cutter's front face) of the respective cutting edges of any two disc-shaped bits 24, will only vary by $$\Delta r - \Delta r \sin \emptyset$$

Therefore, the cutting portion of any individual cutting tool 24 mounted in nest plate 22, i.e., that portion of the cutting tool which projects outwardly above the front face 11 of the cutterhead, will fall within an axial tolerance ("x" in FIG. 4) equal to one-half or less of the normal diametral tolerance for the cutting discs. This tolerance is quite small, and so all cutting edges projecting above the cutterhead within this tolerance are considered to be, for purposes of this disclosure, substantially in a common plane.

Since nesting plates 22 are manufactured with sufficient precision to assure that plate-to-plate differences are practically negligible insofar as cutting tolerances are concerned, the just-described disc support structure assures that the cutting edges of the disc-shaped cutting tools, when secured within their respective nest plates in the cutting head, will all project axially in a nearly identical track in the cutting plane without requiring any special truing adjustments.

In the embodiment disclosed in FIGS. 1-3, attention is called to the fact that the cutter head slots are designed to provide each cutting tool 24 with a "double negative" rake as shown in FIGS. 1 and 2 (the negative rake not being shown in FIG. 3 for the sake of clarity). The cutter head is designed to be rotated in the direction of arrow 70, and the rake is negative in both the horizontal and vertical planes, being provided by the design of each slot 20. Horizontal negative rake is shown in FIG. 1 as the angle a formed between the projection of one side of a slot 20 and a radial line passing through axis 18 of the cutter head. Similarly, vertical negative rake is shown in FIG. 2 as the angle b formed between a vertical projection of a side of slot 20 and cutter axis 18.

Of course, as is well known in the art, rake angles are selected in accordance with type and speed of milling being done, as well as in accordance with the type of material being milled. For instance, while the negative rakes indicated would be preferable for cast iron, positive rake angles would be preferred when milling aluminum. Where such positive rake angles are preferred, conical tool bits may be used in appropriately designed nest plates such as those referred to below, and the built-in rake angles a and b could be reversed or the cutter could be rotated in the opposite direction.

(c) Wedges and Indexing Bits

As can be most readily seen in FIG. 2, each lower wedge 26 is designed so that it impinges only on the lower portion of its respective nest plate 22, while each upper wedge 28 presses only against its respective disc-shaped cutting tool 24, the latter being slightly thicker than the nesting plate which carries it. This design not only adds rigidity, but permits the indexing or changing of cutting tools 24 without removal of nest plates 22. The loosening of bolt 38 and upper wedge 28, and the tightening of adjustment screw 56 in nest plate 22, releases pressure on disc-shaped cutting tool 24 so that it can be readily replaced or indexed to expose a new cutting edge. Following such a change, the adjustment of screw 56 followed by the retightening of wedge 28 again readies cutting tool 24 for use. For reasons noted above, such indexing or replacement of the disc-shaped bits does not have to be followed by any further truing adjustment so long as the individual cutting discs used in the disclosed apparatus are within their proper manufacturing tolerances.

(d) Nest Plate for Conical Cutter Bit

Figure 7:
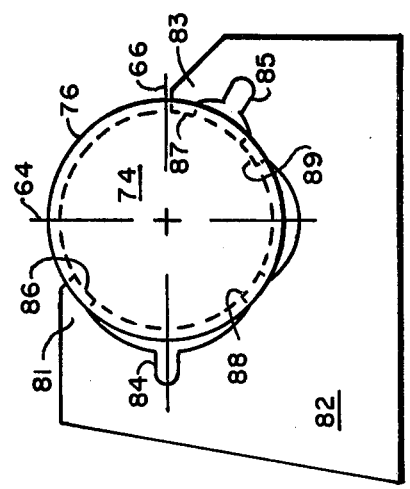
FIG. 7 is a side view of a third embodiment of nest plate, also adapted for use with conical cutter bits but designed primarily for cutter-radial accuracy.
Figure 6:
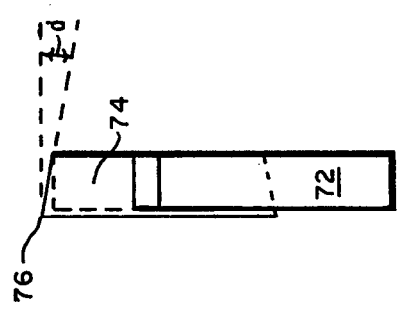
FIG. 6 is an end view of the nest plate and cutter bit shown in FIG. 5.
Figure 5:
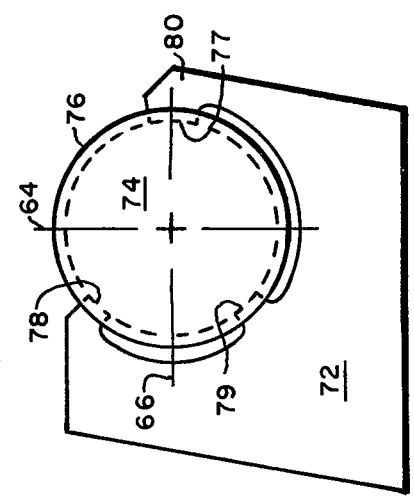
FIG. 5 is a side view of a second embodiment of nest plate adapted for use with conical cutter bits and designed primarily for cutter-axial accuracy, one such conical cutter bit being shown mounted therein.

FIGS. 5, 6 and 7 illustrate two further embodiments of nest plates specifically adapted to hold conical disc-shaped bits. This type of cutter bit is well known, and its conical form can best be appreciated from FIGS. 5 and 6. Nest plate 72 holds cutter bit 74 which has a conical shape providing a relief angle d for its cutting edge 76.

Like the preferred embodiment of nest plate described above, nest plate 72 is also designed for special accuracy in the cutter-axial direction. Bit 74 is held by three support surfaces 77, 78, and 79. Nest plate 72 is designed so that its support surface 77, on extended portion 80, is movable relative to support surfaces 78 and 79 and is slightly undersized relative to the smallest diameter cutter bit within the manufacturer's tolerance. Therefore, when a conical bit 74 is pressed into position in the nest, it causes a slight movement of support surface 77 away from support surfaces 78 and 79 which are fixed relative to the main body of nest plate 72. This preloads extended portion 80 so that support surface 77 provides constant pressure to hold disc-shaped bit 74 tightly against the other two support surfaces.

In this design, the bisector between support surfaces 78 and 79 is coincident with radial axis 66 so the centers of all bits within manufacturer's tolerance will fall on this line. Therefore, it will be appreciated that the blade-to-blade variation in the cutterhead will be no greater than ½ of the manufacturer's diametral tolerance for the discs.

Referring now to FIG. 7, nest plate 82 is a further embodiment adapted for use with conical disc-shaped bits. However, this nest plate is designed to maximize radial accuracy rather than axial accuracy. Nest plate 82 has a pair of extended portions 81 and 83 separated from the main body of the nest plate by slots 84 and 85, and support surfaces 86 and 87 are formed, respectively, at the outer extremities of extended portions 81 and 83. Similar to nest plate 72 just described above, nest plate 82 is also made slightly undersized so that disc-shaped bit 74 must be pressed into place, causing slight movements of both extended portions 81, 83 and thereby preloading the nest plate so that support surfaces 86 and 87 press bit 74 tightly against support surfaces 88 and 89 which remain fixed relative to the main body portion of nest plate 82. In this embodiment, the line bisecting support surfaces 88 and 89 is coincident with axial diameter 64 of disc-shaped bit 74. Therefore, the centers of any cutting disc falling within the manufacturer's tolerance will fall on the vertical orthogonal diameter, namely, axial diameter 64, and blade-to-blade variation in the cutter-radial direction will vary no more than ½ of the manufacturer's diametral tolerance for the cutting discs.

When indexing a conical bit 74, only the upper wedge 28 is removed, and then bit 74 is loosened by being pressed away from its nest plate, indexed, and then pressed back into position. This is followed by replacement of upper wedge 28, and the cutterhead is ready for use again without the need for any further truing of the bit's newly exposed cutting edge.

(e) Cutterhead Features

Certain features of the preferred embodiment of a cutterhead according to the invention herein will now be described in relation to FIGS. 8, 9 and 10. As stated above, the invention herein divides the traditionally solid annular cutter body into two separate and distinct structural elements. The main element is disclosed in FIG. 8 and comprises rim portion 10 surrounding a central web 12. The other major structural element of the cutterhead is ring member 30 (most easily seen in FIG. 10) which, in the manner described above, is drawn into tight contact with rim portion 10 and central web 12 by a plurality of bolts 32 (shown only in FIG. 3). In this preferred embodiment, the cutterhead is secured to the arbor of a machine spindle by means of bolts 16 which pass through both ring member 30 and central web 12.

Figure 8:
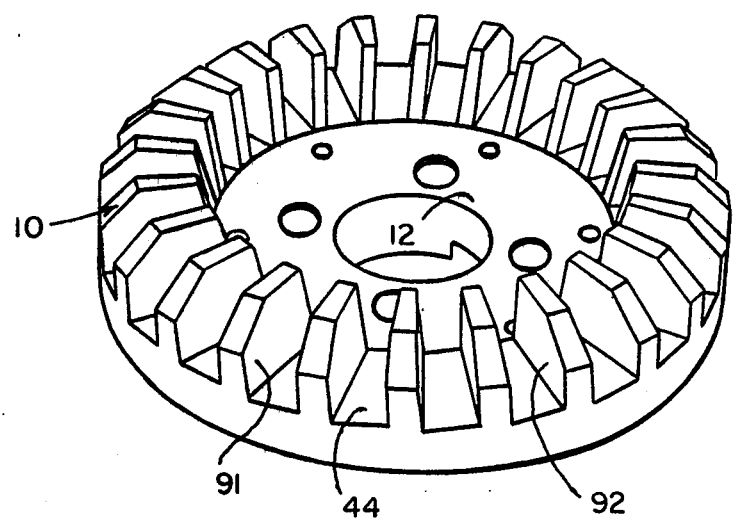
FIG. 8 is a perspective view of only the main body member of a cutterhead according to the invention, showing the slots formed through the full radial width of the rim portion thereof.

As can be seen best in FIG. 8, the blade-receiving slots are cut through the entire radial width of rim portion 10 to form the sidewalls 91, 92 and the floor 44 of each blade-receiving opening. The outer diameter surface 34 of ring member 30 provides the inner wall for each blade-receiving opening.

By dividing the cutterhead into two separate parts and using both of these parts to form the blade-receiving opening, the invention herein avoids the weakening stress points which form in prior art cutters at the intersection of the side and interior walls of these openings, thereby greatly increasing the strength of the cutterhead to make it possible to operate the head at much higher speeds and feeds.

In the preferred embodiment of the cutterheads, special means are provided for delivering chip-flushing cutting fluids directly over each cutting blade. The fluid is delivered through a series of passages 94 formed in the body of ring member 30, each of these passages being provided with an opening 95 positioned to direct fluid over the front face of rim portion 10 to flush chips away from the cutting blades. Such alignment of openings 95 is assured by well known means (not shown). Each of the passages 94 connects to an annular groove 96 in the bottom of ring 30, groove 96 cooperating with a further fluid passage 97 in central web 12 of the main cutterhead member for interconnection with a fluid dispensing system in the machine arbor, as is known in the art.

The preferred cutterhead also includes an annular safety shroud 98 which has an inner circumferential surface adapted to mate with the outer circumferential surfaces of rim portion 10. Shroud 98 is secured in position around the cutting head by a bolt 99 appropriately interconnecting the two ends of shroud 98 which is split to facilitate its attachment and removal. Shroud 98 is designed so that, when properly fitted to the outside of the cutterhead, it overlaps the exterior ends of all of the blade-receiving openings so that its presence will prevent the accidental release of the cutting tools, nests, or wedges should these latter members be improperly secured prior to operation of the cutter.

Figure 9:
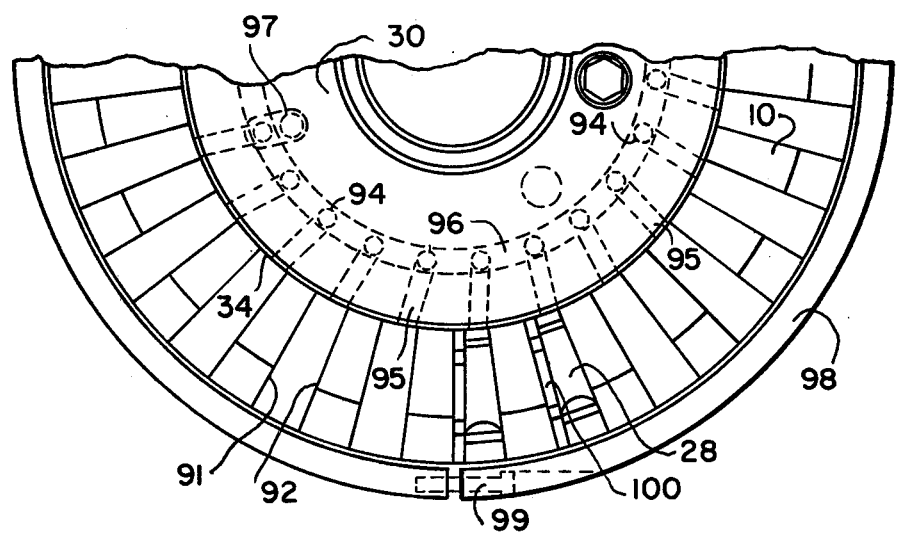
FIG. 9 is a partial plan view of the preferred embodiment of the cutterhead of the invention, including a structural interior ring with lubricating means and an external safety shroud, and showing only two cutter bits in nest plates mounted therein.
Figure 10:
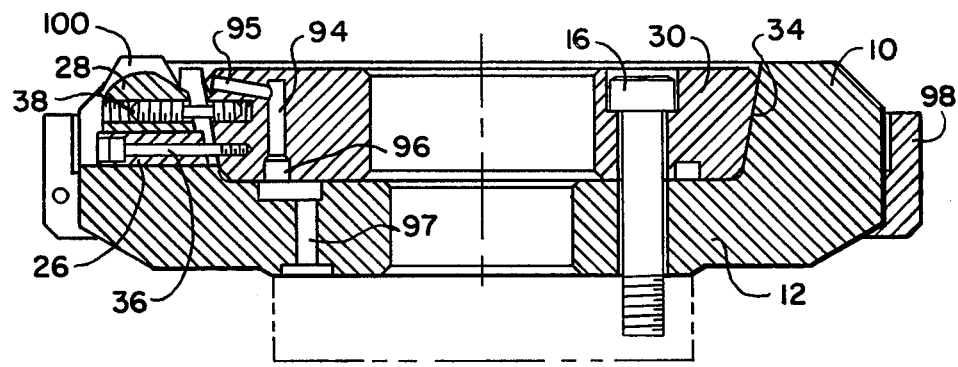
FIG. 10 is a cross-sectional view of the apparatus in FIG. 9.

Attention is called to the fact that the cutterhead illustrated in FIGS. 9 and 10, is shown with still another conventional type of cutter, namely, hexagonal cutter bits 100. These bits are held in nest plates similar to those disclosed above but appropriately modified for adaption to the hexagonal contours of these bits. They are similarly held in place by lower wedges 26 and upper wedges 28. The novel cutterhead disclosed herein can be fitted entirely with this type of bit or with cutter bits of other shapes as desired, the nest plate being modified slightly to accommodate the differences in shape.

It is also contemplated that flat sided cutter blades, such as hexagonal bits 100, can be used as "wiper" blades in a cutterhead otherwise fitted with disc-shaped blades as disclosed above. The latter blades would be used for doing most of the cutting, while the wiper blades would take only a very small additional cut to provide a flatter and less scalloped finish to the work being milled.

What is claimed is:

1. In a face mill cutter comprising a cutter body having a front face, a back face, and circumferential surfaces which define a generally cylindrical body which can be mounted on a machine spindle for rotation about an axis which passes through the centers of said front and back faces, said cutter body also having a plurality of substantially identical radially oriented slots formed in said front face, each of said slots being adapted to receive one of a plurality of substantially identical nest plates for supporting disc-shaped cutting tools in positions in which the cutting edges of said tools project outwardly from said front face into a common cutting plane and each slot being further adapted to receive clamping means for securing said nest plates and cutting tools in said cutter body, the improvement wherein:

the diameter of each said disc-shaped tool measures between a minimum and maximum manufacturing tolerance;

each said nest plate has a main body with an opening formed therein for receiving more than one-half the circumference of a respective disc-shaped tool, said opening being shaped to provide at least three support surfaces for contacting portions of the outer circumference of said tool, two of said support surfaces being fixed relative to said main body and the other said support surface being movable relative to said main body; and means cooperating with said movable support surface for (a) positioning said disc-shaped tool against both said fixed support surfaces and for (b) securing said tool within said nest so that, when said nest plate is thereafter secured in said cutter body by said clamping means, the projecting cutting edge of said tool lies substantially in said common cutting plane within a tolerance equal to one half or less said diametral manufacturing tolerance.

2. The face mill cutter of claim 1 wherein said cooperating means includes an extended portion of said nest plate, said extended portion being connected with said movable surface which is to be adjusted, and further including an adjustment screw carried through bores formed in said extended portion and said main body of the nest plate, to thereby provide for a slight movement of the extended portion relative to the main body portion as the screw is rotated.

3. The face mill cutter of claim 1 wherein said cutter body is assembled from components which include:

an annular member which defines said back face and said circumferential surfaces together with a portion of said front face, said annular member including a central web for defining said back face and a rim portion for defining said circumferential surfaces and said portion of said front face, and wherein slots are formed in said rim portion for receiving said nest plates and said disc-shaped tools, and a ring member which fits within said annular member for defining a remaining portion of said front face, said ring member including an outer diameter surface which is tapered to mate with a tapered inner diameter surface of said rim portion, and ring mounting means for securing said ring member to said annular member so that said outer diameter surface of the ring member is tightly secured against said inner diameter surface of said rim portion when the ring member contacts said inner web.

4. The face mill cutter of claim 3, wherein said nest plates include seating surfaces which mate with said tapered surface of the ring member.

5. The face mill cutter of claim 3, wherein said clamping means is interconnected with said ring member for securing said next plates and cutting tools into slots formed in said cutter body.

6. The face mill cutter of claim 1 wherein the clamping means for each nest plate and tool comprise a first wedge which secures only the nest plate, and a second wedge which secures only the disc-shaped cutting tool supported by said nest plate.

* * * * *